United States Patent Office 2,741,581
Patented Apr. 10, 1956

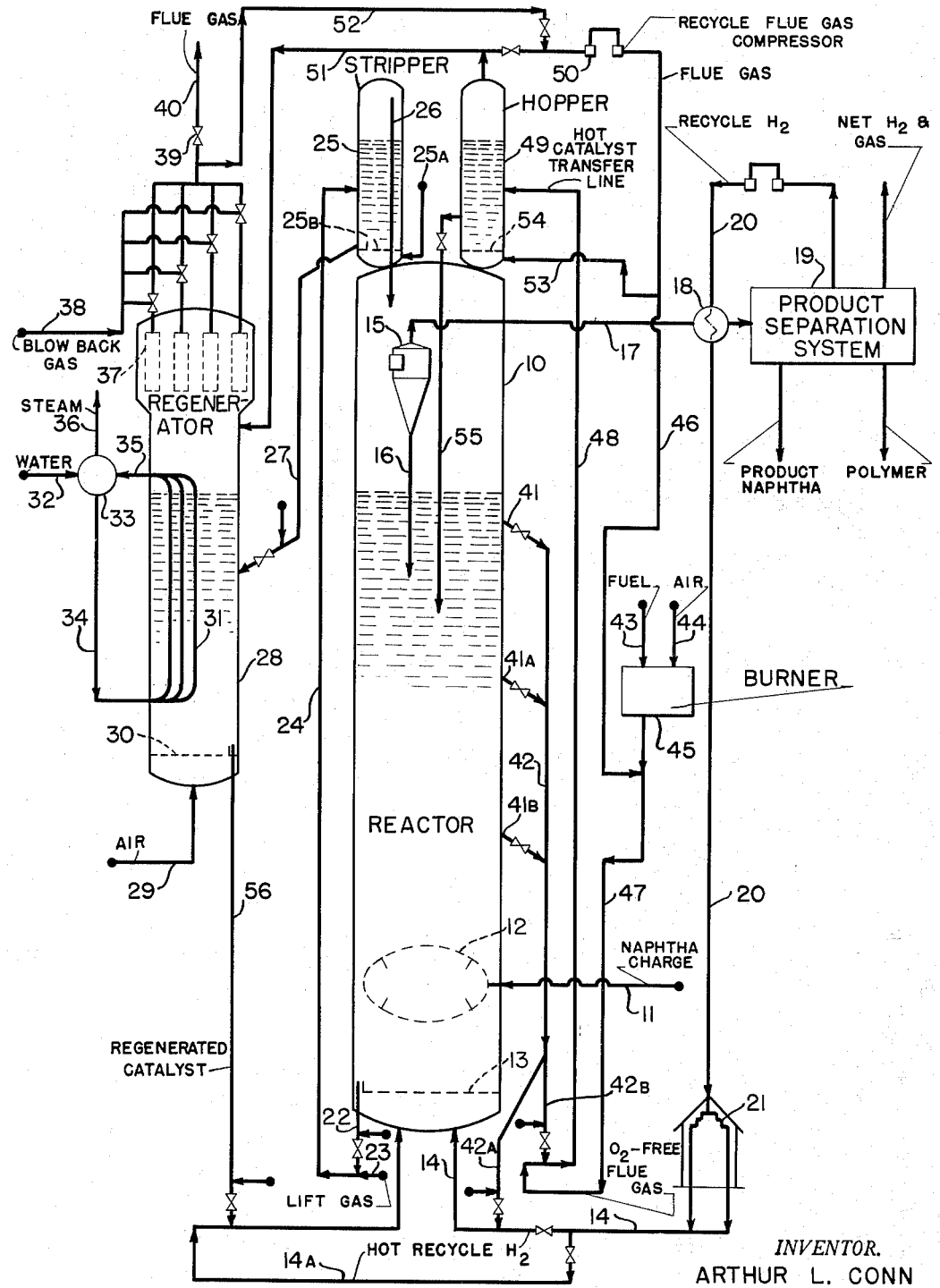

2,741,581

FLUID HYDROFORMING WITH CATALYST RECYCLE

Arthur L. Conn, Chicago, Ill., assignor to Standard Oil Company, Chicago, Ill., a corporation of Indiana Application December 1, 1951, Serial No. 259,425

5 Claims. (Cl. 196—50)

This invention relates to the treatment of hydrocarbons of the naphtha boiling range with solid catalyst of small particle size in the presence of hydrogen by a fluidized solids technique for obtaining octane number improvement, dehydrogenation, aromatization, isomerization, desulfurization, etc., and it pertains more particularly to an improved fluid hydroforming system embodying catalyst recycle.

Heretofore, fluidized solids technique has been extensively employed for effecting catalytic cracking of gas oils and to some extent for effecting reforming of lower boiling hydrocarbons. Hydroforming has been commercially employed in fixed bed units and although it has often been proposed that fluidized solids technique be employed for effecting hydroforming it has been recognized that hydroforming presents certain problems that are not encountered in catalytic cracking. Whereas in catalytic cracking high catalyst to oil ratios may be employed to transfer heat to the reactor and thus supply the endothermic heat of reaction, in fluid hydroforming they result in a degradation of product quality and/or yields. The use of higher naphtha preheat temperatures causes some thermal reforming, with resultant degradation in yield and product quality. Increasing the temperature of the recycle gas above 1100° F. presents additional metallurgical problems in furnace design. While cracking catalyst is effective in its fully oxidized state as it leaves the regenerator, hydroforming catalyst requires some degree of reduction or conditioning. Hydroforming requires high pressures usually of the order of 100 to 500 p. s. i. which in turn creates problems of overcoming erosion and catalyst losses when catalyst-containing fluids are depressured. In catalytic cracking, if some hydrocarbon material from the reaction side gets into the regenerator, it merely burns therein, but if appreciable amounts of hydrogen should find their way into the regenerator, the operation would be more hazardous. An object of my invention is to provide a method and means for solving these and other problems presented by the application of fluidized solids technique to hydroforming.

Although temperatures are usually remarkably uniform in fluidized solids beds, when the diameter of the bed is sufficiently small as compared to its height and the total heat requirement is supplied at the base of the bed, there is a tendency for the top of the bed to be somewhat cooler than the bottom thereof. This condition exists in fluid hydroforming because it is necessary to have a relatively small diameter vessel to insure high enough velocities for fluidization, while a relatively large height is required to give the low space velocities required. It is impractical to supply additional heat to the upper part of the dense phase fluidized bed by indirect heat transfer (in the manner that heat is removed in the regenerator) because materials of construction are not readily available for withstanding the required operation conditions. An object of my invention is to provide an improved method and means for obtaining greater uniformity of temperature in tall, small diameter fluidized beds. A further object is to provide an improved method and means for adding heat to such a fluidized solids system.

An important object of my invention is to minimize regeneration requirements of fluidized catalysts employed for treating hydrocarbons in the presence of hydrogen. Other objects of the invention will become apparent as the detailed description of the invention proceeds.

In practicing my invention, I employ a tall vertical reactor whose height is about 5 to 20 times its diameter. Superheated hydrogen, preferably a recycle gas stream, at a temperature of about 1100 to 1300° F., is introduced at the base of the reactor and distributed across the cross sectional area thereof. Catalyst may be introduced at the base of the reactor with said superheated hydrogen or may be introduced at a higher level in the reactor either with or without a preconditioning or partial reduction step. Charging stock vapors are introduced into the reactor with recycled hydrogen or, when the latter is superheated, at a level spaced from the hydrogen inlet by about .5 to 2 reactor diameters so that below the charging stock inlet the superheated hydrogen will contact only catalyst and thus will not cause thermal cracking or degradation of the charging stock. A deep dense turbulent catalyst bed is maintained in the reactor at a depth sufficient to give the required low space velocity which in the case of molybdena-on-alumina catalysts may be approximately 0.5 w./hr./w., the ratio of hydrogen to charging stock being at least as great as heretofore employed in fixed bed operations, e. g. in the range of 1:1 to 10:1 or about 5:1 on a mol basis.

In order to minimize product degradation, the weight ratio of regenerated (and reconditioned) catalyst to oil should be in the range of .1 to 1 or preferably .3 to .4. Catalyst is withdrawn at a corresponding rate directly from the dense phase at a point spaced from the point of catalyst inlet so that short circuiting of regenerated catalyst may be avoided. The withdrawn catalyst is then conveyed by steam or hot hydrogen through an internal or external riser to an elevated stripper-hopper so that the necessary catalyst head is obtained for introducing catalyst to the regenerator. Gas from the top of the stripper-hopper is returned to the dilute phase in the reactor to avoid catalyst loss and the necessity of extraneous depressuring means. Regenerated catalyst may be introduced directly from the regenerator to a point in the reactor below the charging stock inlet or it may be picked up with superheated hydrogen for introduction into the base of the reactor or it may be preconditioned by treatment with hydrogen at a temperature of approximately 800 to 1100° F. and then returned to the reactor.

One method of obtaining greater uniformity of temperature in the reactor is to withdraw catalyst from upper levels of the dense phase, suspend the withdrawn catalyst in hot hydrogen and return the suspension to the bottom of the reactor. By this method of operation, cyclic circulation of catalyst through the conversion zone is maintained in addition to the turbulence exhibited by the catalyst in the dense phase itself. Furthermore, the treatment of withdrawn catalyst with hot hydrogen assists in the removal of adsorbed hydrocarbons from said catalyst and thus prolongs catalyst activity and minimizes regeneration requirements. The cyclic flow of catalyst may also be obtained by circulating catalyst with hot hydrogen from the lower to the upper part of the dense phase so that there will be a net downward flow of catalyst in the main portion of the turbulent dense phase.

Instead of or in addition to the cyclic catalyst flow obtained by use of hot hydrogen, an independent cyclic flow of catalyst may be maintained by the use of hot high pressure flue gas which is substantially free from oxygen.

Thus catalyst may be withdrawn from an intermediate level of the dense catalyst phase in the reactor and conveyed by hot oxygen-free flue gas to a high level so that in the conveying step the conveyed particles are heated by the flue gas to a temperature in the range of 1000 to 12000° F. The heating of the catalyst with oxygen-free flue gas does not appreciably increase its carbon content nor cause oxidation of the catalyst so that this method of heating the catalyst avoids the disadvantage of circulating larger amounts of catalyst to the regeneration zone (employing higher catalyst to oil ratios). The catalyst thus externally reheated by oxygen-free flue gas can be returned to one or more upper parts of the dense fluidized catalyst bed in the reactor for supplying additional endothermic heat of conversion to the reactor and for obtaining more uniform conversion temperatures therein. The hot flue gas separated from catalyst which it has reheated may be introduced into the upper part of the regenerator so that no additional depressuring equipment will be required and loss of catalyst from the system will be prevented.

The invention will be more clearly understood from the following description of a specific example thereof read in conjunction with the accompanying drawing which is a schematic flow diagram of a 2000 barrel per day fluid hydroforming unit embodying my invention.

The invention will be described as applied to a 53° A. P. I. naphtha of low sulphur content boiling in the range of about 200 to 330° F., having a C. F. R. R. octane number of about 60 which is hydroformed by the use of a molybdena-on-alumina catalyst having a particle size in the range of 1 to 200 microns, most of the catalyst being about 20 to 100 microns in particular size. The catalyst should be as free as possible from contaminants such as iron, the preferred catalyst being made either from pure aluminum chloride by processes of the type disclosed in U. S. 2,432,286, 2,481,824, etc., or from high purity passive aluminum metal by processes of the type disclosed in U. S. 2,274,634, 2,345,600, 2,371,237, etc. The molybdena content of the catalyst should preferably be in the range of about 5 to 20 weight percent. No invention is claimed in the catalyst per se, and it should be understood that any known hydroforming or hydrofining catalyst may be employed. The contact time and operating conditions will be dependent, of course, on the particular catalyst and its activity (as well as on the charging stock and nature of results desired); platinum-containing catalysts (U. S. 2,479,109–10) may require somewhat lower temperatures and lower contact time than molybdena-alumina catalysts. Other group VI metal oxides or sulfides on gamma-alumina supports may be employed either with or without added group VIII metal oxides or sulfides such as nickel or cobalt oxides or sulfides, examples of mixed catalysts being the so-called cobalt-molybdate catalysts, nickel-tungstate, etc., with more or less of the oxygen replaced by sulfur. The reactor 10 in this case is an insulated pressure vessel with a 5 foot 3 inch I. D. lining in about a 7 foot I. D. shell about 60 feet tall. Charging stock vapors at a temperature of about 850 to 1000° F., preferably about 900 to 950° F., are introduced by line 11 through a suitable distributor 12 which is about 3 to 5 feet above distributor grid 13 and is, generally speaking, about one-half to two reactor diameters from the bottom of the reactor. A simple method of introducing charging stock vapors is to simply introduce them at 3 or more spaced points around the circumference of the reactor. Superheated hydrogen is introduced at the base of the reactor through line 14 and/or through line 14a when said superheated hydrogen is employed as a carrier gas for returning regenerated catalyst. A turbulent dense phase catalyst bed is maintained in the reactor with its upper level about 55 feet from the reactor bottom. In this example, the naphtha is supplied at the rate of approximately 2000 barrels per day or approximately 22,350 pounds per hour, superheated hydrogen is introduced at the base of the reactor at about 1100 to 1300° F., or about 1200° F., at the rate of about 1300 mols per hour, or approximately 18,000 pounds per hour. The upward gas velocity is thus in the range of about .5 to 1.5, or approximately .8 to .9 foot per second, giving a catalyst bulk density of approximately 30 pounds per cubic foot. The charging stock contact time is approximately one minute and the weight space velocity is about .4 to .5. The pressure at the base of the reactor is approximately 260 p. s. i. g. and at the top of the reactor about 250 p. s. i. g. Reactor temperature is about 800° to 1000° F.

The product stream is withdrawn from the dilute phase in the upper part of the reactor through cyclone separator 15, separated catalyst particles being returned by dip leg 16 to a point below the dense phase level. From separator 15, the product stream passes by line 17 through heat exchanger 18 and thence to product separation system 19. Since no invention is claimed in the product separation system, it requires no detailed description. Generally speaking, however, the product stream may be further cooled by heat exchange with incoming charging stock and introduced into a baffled scrubbing section in a fractionating tower operating at substantially reaction pressure (about 240 p. s. i. g.) and with a top temperature of about 270 and a bottom temperature of about 420° F. Catalyst particles are removed in heavy condensate and may be recycled to the reactor. The overhead from this fractionator may then be condensed and the recycled hydrogen separated therefrom from compression and recycling by line 20 through heat exchanger 18. So-called "polymer" may be recovered from the high boiling material leaving the first fractionator, the unrecycled portion of the separated hydrogen may be scrubbed with incoming charging stock for recovery of gasoline boiling range components therein and uncondensed gaseous components and product naphtha may be separately recovered in any known manner. In the system herein described, the dry gas production may be about 10 to 12 weight per cent, polymer about 3 weight per cent, butane-containing gasoline about 85 weight per cent, and coke approximately .5 weight per cent. The product gasoline is substantially free from sulfur and may be characterized by a C. F. R. R. octane number of approximately 100.

The recycled hydrogen is heated in exchanger 18 to approximately 700° F. and then superheated in furnace 21 to a temperature of about 1100 to 1300° F. for return through lines 14 or 14a to the base of the reactor.

Catalyst is withdrawn from the lower part of the reactor above grid 13 through line 22 and carried by a lift gas such as steam (or hot hydrogen from line 20) through line 24 to an intermediate point in the stripper-hopper vessel 25 which in this case is about 2 to 3 feet in diameter by about 25 feet in height. The stripper-hopper may be provided with an aeration line inlet 25a and an aeration distributor grid 25b so that aeration and/or stripping may be effected in vessel 25 by the introduction of steam, hot hydrogen or any other inert gas through line 25a. Separated gas from the top of vessel 25 is returned by line 26 to the upper part of reactor 10. Construction costs are minimized by mounting vessel 25 immediately above and contiguous with the top of reactor 10 so that line 26 may be a simple vertical pipe; however, an external line may be employed for connecting the top of the vessel 25 to the top of reactor 10, it being important that any catalyst in the stripper gases be recovered and that depressuring expense be minimized.

Catalyst from the lower part of stripper-hopper 25 passes by a standpipe 27 to a level below the dense catalyst phase in the regenerator 28. Air is introduced into regenerator through line 29 at the rate of about 114 mols per hour (3270 pounds per hour) under a pressure of about 260 p. s. i. g., the pressure above the level of grid 30 being about 257 p. s. i. g. and at the top of the regenerator being about 253 p. s. i. g. It should be understood that standpipe 27 is of sufficient length so that the pressure above the control valve at the base thereof is approximately 258 p. s. i. g., the pressure at the top of vessel 25 being substantially the same and only slightly above the approximately 250 p. s. i. g. maintained in the top of reactor 10.

To remove the heat of regeneration and thus avoid heat damage to the catalyst, cooling tubes 31 may be mounted therein, cooling water being introduced from line 32 to separator 33 and thence conveyed by line 34 to the base of tubes 31, the top of said tubes being connected by line 35 to separator 33 from which steam may be withdrawn through line 36. A series of filters 37 may be employed in the upper part of the regenerator for avoiding any catalyst loss and preventing erosion difficulties when flue gas is reduced to atmospheric pressure. The usual blow-back system may be employed by introducing hot blow-back air or flue gas through line 38 to remove deposits from part of the filters while the remaining filters are in operation, the filtered flue gas being passed through pressure reducing valve 39 and conveyed by line 40 to a suitable flue.

Since reactor 10 is so tall and narrow, there is a tendency for the upper part of the fluidized bed to be somewhat cooler than the lower part thereof. In order to maintain a more uniform temperature throughout the reaction zone, catalyst may be withdrawn from one or more upper levels of the dense catalyst phase through line 41 to standpipe 42 and this withdrawn catalyst, without regeneration, may then be passed through branch leg 42a of the standpipe and be picked up by hot hydrogen in line 14 and returned to the base of the reactor. This external recycle of unregenerated catalyst obtains two important advantageous results: it causes the circulatory flow of catalyst through the reactor which in turn makes for greater uniformity of temperatures therein and tends to maintain the activity of the catalyst at a high level by the contacting which it receives with hot hydrogen in the absence of charging stock. Instead of simply returning the withdrawn catalyst with superheated hydrogen through line 14, the catalyst from the base of branch leg 42a may be picked up from hydrogen from line 20 and then passed through a heating zone thereby increasing the heat capacity of the total stream introduced through line 14. Standpipe 42 may be heated and/or the catalyst flowing therethrough may be separately heated before being suspended in superheated hydrogen from line 14. When an exothermic hydrogenation reaction is being effected, the withdrawn and recycled catalyst stream may be picked up with recycled hydrogen and thereafter be cooled before its introduction at the base or at other points in the reactor. The external recycle of catalyst from an upper to a lower point of the reactor by means of recycled hydrogen is thus advantageous from many standpoints but in the particular example herein described, its chief benefits are the attainment of more uniform conversion temperatures from top to bottom in the reactor and the prolonged catalyst activity that is made possible by contact with hydrogen at high temperature.

Alternatively, more uniform temperatures may be obtained from top to bottom in the reactor by withdrawing catalyst from the dense phase therein through lines 41a and 41b at intermediate levels in the dense phase and employing branch leg 42b instead of 42a of standpipe 42. In this case a gaseous, liquid or even a solid fuel from line 43 may be burned with air or oxygen-containing gas from line 44 in high pressure burner 45 under conditions to give a flue gas which is substantially free from oxygen. This gas is mixed with recycle flue gas from line 46 to reduce its temperature and thus avoid damage to the catalyst, and the combined gases pass through line 47 to the base of branched leg 42b of standpipe 42 where they pick up catalyst and carry it through line 48 to hot catalyst hopper 49 which is preferably superimposed above reactor 10. Part of the gases from hopper 49 may pass directly to the flue gas compressor 50, or it may be desirable to pass all of the gases through line 51 and filters 37 to remove catalyst fines before return to the recycle flue gas compressor 50 by line 52, a small amount of hydrogen being added to line 52 when necessary to insure its being oxygen-free. If half the heat of reaction is supped by this means, it will be necessary to supply 2000 to 3000 lbs. per hour of flue gas from the burner, to recycle 40,000 to 50,000 lbs. per hour of flue gas through line 46, and to circulate about 60,000 to 70,000 lbs. per hour of catalyst through line 48.

Standpipe 42 and branch leg 42b should be of such length as to provide a pressure of about 260 to 262 p. s. i g. immediately above the control valve so that a pressure of approximately, but slightly greater than, 253 p. s. i. g. may be maintained in the upper part of hot catalyst hopper 49. This hopper may be mounted adjacent to stripper-hopper 25. Catalyst and recycle gas from line 48 may be introduced into the dense phase of hopper 49 as shown, or through a bottom grid, or the catalyst may be separated from the flue gas by means of cyclone separators. When necessary, a small portion of the recycle gas may be introduced to the base of the hopper through line 53, and distributed through grid 54 to insure proper aeration of the catalyst in the hopper. During its transfer through line 48 and in hopper 49 the catalyst is heated by the hot flue gas to a temperature of the order of 1000 to 1200° F., e. g. about 1100° F., and such hot catalyst may be returned in regulated amounts by line 55 to the upper part of the dense catalyst phase in the reactor. Part or all of the gases from the top of the hot catalyst hopper may be returned by line 51 to the upper part of regenerator 28 so that no catalyst will be lost from the system and no separate catalyst recovery or depressuring equipment will be required.

By withdrawing catalyst from the intermediate part of the dense phase in the long narrow reactor, heating it with oxygen-free flue gas in line 48 and hopper 49 and returning it to the upper part of the reactor by line 55 as hereinabove described, additional heat is provided for supplying a part of the heat of reaction and more uniform temperatures are obtainable throughout the dense phase catalyst bed. It should be understood, of course, that the reheated catalyst may be returned to the reactor through a plurality of lines 55 leading to spaced levels in the dense phase and that similarly catalyst may be withdrawn from various levels in the dense phase by lines 41, 41a, 41b, etc., so that this system of operation provides great flexibility. It is altogether separate and independent from the regeneration and may be employed for supplying endothermic heat to reactors employing catalysts which do not require regeneration.

When regeneration is employed as in the case of molybdena-on-alumina catalyst as described in this example, about 8000 pounds per hour of regnerated catalyst is withdrawn from the lower part of the regenerator through standpipe 56 and picked up by superheated hydrogen from line 14a for return to the reactor. It should be understood, however, that if desired the withdrawn catalyst may be partially reduced or conditioned in the separate treating zone before or after it is introduced into the reactor. For example, catalyst from standpipe 56 may be introduced into a small conditioning vessel and contacted with hot hydrogen from line 20 or a mixture of such hot hydrogen with superheated hydrogen from line 14. If desired, the off-gases from this preconditioning step may be introduced above the dense phase level in reactor 10 and the catalyst may be returned directly to the base of the reactor as more fully described in co-pending application Ser. No. 253,498 filed October 27, 1951. Many other alternative arrangements and modifications will be apparent from the above description to those skilled in the art. It will also be understood that the specific operating conditions hereinabove described are applicable to the defined charging stock and molybdena-on-alumina catalyst; with other charging stocks and other catalysts, operating conditions will, of course, be selected which are known to be effective with such catalysts and charging stocks and since these are well known to those skilled in the art, they require no detailed description. It will be understood, of course, that standpipes such as lines 22, 27, 42a, 42b, 55 and 56 will be provided with usual slide valves or equipment to control pressure and/or flow from their discharge ends and that suitable aeration lines will be provided above said valves wherever required for maintaining the catalyst in fluidized condition. It will also be understood that a portion of the superheated hydrogen from line 14 may be employed instead of an oxygen-free flue gas for reheating catalyst and conveying it to an elevated hopper such as hopper 49; when superheated hydrogen is employed for this purpose, hopper 49 will be maintained at a top pressure substantially the same but slightly higher than the top pressure in reactor 10 and the gases from line 51 will be returned to the top of the reactor instead of to the top of the regenerator. An even simpler method of distributing the heat to the upper part of the reactor is to provide a simple tube riser within the reactor itself and to inject a portion of the superheated hydrogen at the base of said riser for carrying catalyst to the upper part of the reactor, out of contact with the dense phase therein while it is being heated with the superheated hydrogen stream; however, this method would require heating the naphtha and/or the hydrogen to much higher temperatures to supply the heat of reaction. In all cases it will be noted that the temperature in the reactor is made more uniform by withdrawing catalyst directly from the dense phase, heating the withdrawn catalyst by direct contact with an oxygen-free heating gas and returning the heated catalyst to the dense phase in the conversion zone to effect cyclic flow of catalyst through the conversion zone in addition to the turbulent flow therein.

I claim:

1. In an endothermic process for the conversion of a hydrocarbon charging stock of the naphtha boiling range in the presence of hydrogen by means of fluidized solids conversion catalyst in a high pressure zone which is so narrow in cross sectional area with respect to its height that the upper part of said zone tends to be cooler than the lower part because of the endothermic nature of the process, the improved method of operation which comprises supplying heat to the lower part of said zone by introducing thereto a stream of hydrogen which has been superheated to a temperature above 1000° F., withdrawing dense phase fluidized catalyst directly from an intermediate level in the reaction zone, suspending said withdrawn catalyst in a hot oxygen-free gas of the class consisting of flue gas, hydrogen and mixtures thereof at a higher temperature than the temperature of the withdrawn catalyst, conveying said withdrawn catalyst to a higher elevation than the reaction zone by means of said hot oxygen-free gas, separating said hot oxygen-free gas from catalyst which has been heated thereby and returning the heated catalyst, to the upper part of said zone.

2. The method of effecting fluid hydroforming in a column of fluidized hydroforming catalyst whose depth is at least five times its diameter, which method comprises introducing hot regenerated catalyst and hot hydrogen at the base of said column for supplying heat at the lower part of the column, withdrawing catalyst from an intermediate level in said column, suspending said withdrawn catalyst in oxygen-free flue gas which is at a higher temperature than that of the withdrawn catalyst and conveying said withdrawn catalyst in said hot oxygen-free flue gas to a higher level than that of the conversion zone, whereby the catalyst is heated in transit, separating gas from the heated catalyst and returning the heated catalyst at the upper part of said column for supplying heat to said upper part.

3. The method of effecting endothermic fluid hydroforming in a fluidized catalyst bed of which the height is at least 5 times the diameter, which method comprises introducing at the base of said bed a hydrogen stream which has been superheated to a temperature substantially higher than 1000° F., introducing at a level spaced from the base of the bed vapors of a naphtha charging stock which have been preheated to at least a conversion temperature in the range of 850 to 950° F., passing the hydrogen and naphtha vapors upwardly through said bed at a velocity to maintain it in fluidized condition at said conversion temperature and under a pressure in the range of 100 to 500 p. s. i. g. whereby the top of the bed tends to become cooler than the bottom thereof, continuously removing a dense phase stream of catalyst from said bed to a stripping zone and then to a regeneration zone, regenerating the catalyst with an oxygen-containing gas and returning regenerated catalyst to said bed, continuously removing a second dense phase stream of catalyst from the bed at a level spaced from the charging stock inlet, suspending said second catalyst stream in a non-oxidizing gas of the class consisting of hydrogen, flue gas and mixtures thereof which non-oxidizing gas has been preheated to a temperature substantially above 1000° F., conveying said suspended catalyst upwardly in said non-oxidizing gas while effecting heat transfer from said gas to said catalyst to raise the temperature of the catalyst to at least about 1000° F. and returning said heated catalyst at the upper part of the fluidized catalyst bed.

4. The method of claim 3 wherein the second catalyst stream is withdrawn from an intermediate level in the catalyst bed, conveyed to a high level by hot flue gas and returned to the upper part of the catalyst bed after separation of flue gas therefrom.

5. The method of claim 4 which includes the step of recycling a portion of the separated flue gas to hot flue gas employed for suspending, elevating and heating the catalyst.

References Cited in the file of this patent

UNITED STATES PATENTS

| | | |
|---|---|---|
| 2,409,690 | Nicholson et al. | Oct. 22, 1946 |
| 2,459,836 | Murphree | Jan. 25, 1949 |
| 2,471,064 | Hall et al. | May 24, 1949 |
| 2,472,844 | Munday et al. | June 14, 1949 |
| 2,643,214 | Hartwig | June 23, 1953 |